(12) United States Patent
Raghunathan et al.

(10) Patent No.: US 10,660,152 B1
(45) Date of Patent: May 19, 2020

(54) INVOKING DRX MODE BASED ON HIGH-QUALITY CONNECTION

(71) Applicant: Sprint Spectrum L.P., Overland Park, KS (US)

(72) Inventors: Sathyanarayanan Raghunathan, Herndon, VA (US); Muthukumaraswamy Sekar, Brambleton, VA (US); Maheswaran Vijayakumar, Herndon, VA (US); Suresh Majjara, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/130,191

(22) Filed: Sep. 13, 2018

(51) Int. Cl.
| | | |
|---|---|---|
| *H04W 76/28* | (2018.01) |
| *H04W 36/00* | (2009.01) |
| *H04W 36/06* | (2009.01) |
| *H04W 88/10* | (2009.01) |
| *H04W 36/30* | (2009.01) |
| *H04L 1/00* | (2006.01) |
| *H04W 76/34* | (2018.01) |
| *H04W 84/04* | (2009.01) |

(52) U.S. Cl.
CPC ......... *H04W 76/28* (2018.02); *H04L 1/0026* (2013.01); *H04W 36/0077* (2013.01); *H04W 36/06* (2013.01); *H04W 36/30* (2013.01); *H04W 76/34* (2018.02); *H04W 88/10* (2013.01); *H04W 84/045* (2013.01)

(58) Field of Classification Search
CPC . H04W 76/28; H04W 76/34; H04W 36/0077; H04W 36/06; H04W 36/30; H04W 88/10; H04L 1/0026
See application file for complete search history.

(56) References Cited

U.S. PATENT DOCUMENTS

| | | | |
|---|---|---|---|
| 2014/0335882 A1 | 11/2014 | Lee et al. | |
| 2016/0192433 A1* | 6/2016 | Deenoo | H04W 72/046 |
| | | | 370/329 |
| 2016/0255523 A1* | 9/2016 | Yi | H04W 48/16 |
| | | | 370/254 |
| 2018/0020503 A1* | 1/2018 | Deenoo | H04W 72/046 |
| 2018/0302814 A1* | 10/2018 | Yi | H04W 48/16 |
| 2019/0174539 A1* | 6/2019 | Siomina | H04W 28/16 |
| 2019/0313280 A1* | 10/2019 | Gottwerth | H04W 28/06 |
| 2019/0313475 A1* | 10/2019 | Siomina | H04W 76/28 |

\* cited by examiner

*Primary Examiner* — Brian D Nguyen (57) ABSTRACT

Disclosed are methods and systems for configuring service of a user equipment device (UE). When the UE has dual-connectivity service, such as EN-DC service, high quality on one of the UE's air-interface connections could result in transition of the UE to operate in discontinuous reception (DRX) mode on the UE's other air-interface connection.

17 Claims, 5 Drawing Sheets

---

DETECT THRESHOLD HIGH QUALITY OF UE'S FIRST AIR-INTERFACE CONNECTION WITH FIRST NB WHEN UE IS OPERATING IN NON-DRX MODE ON BOTH THE FIRST AIR-INTERFACE CONNECTION AND A SECOND AIR-INTERFACE CONNECTION WITH SECOND NB — 40

RESPONSIVE TO AT LEAST DETECTING THE THRESHOLD HIGH QUALITY OF THE FIRST AIR-INTERFACE CONNECTION WHEN THE UE IS OPERATING IN THE NON-DRX MODE ON BOTH THE FIRST AIR-INTERFACE CONNECTION AND THE SECOND AIR-INTERFACE CONNECTION, TRANSITION THE UE TO THE DRX MODE ON THE SECOND AIR-INTERFACE CONNECTION WHILE THE UE REMAINS IN THE NON-DRX MODE ON THE FIRST AIR-INTERFACE CONNECTION — 42

Fig. 5

INVOKING DRX MODE BASED ON HIGH-QUALITY CONNECTION

BACKGROUND

A cellular wireless network typically includes a number of base stations or other access nodes, referred to without limitation as Node-Bs (NBs), that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated) can operate. Each NB could be coupled with a core network that provides connectivity with various application servers and/or transport networks, such as the public switched telephone network (PSTN) and/or the Internet for instance. With this arrangement, a UE within coverage of the cellular network could engage in air interface communication with a NB and could thereby communicate via the NB with various application servers and other entities.

Such a network could operate in accordance with a particular radio access technology, with communications from the NBs to UEs defining a downlink or forward link and communications from the UEs to the NBs defining an uplink or reverse link.

In accordance with the radio access technology, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the NBs and UEs.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

Overview

In a representative arrangement, the core network with which a NB is connected includes a user-plane subsystem, such as a Serving Gateway (SGW) and Packet Data Network Gateway (PGW), or a User Plane Function (UPF), that provide connectivity with a transport network such as the Internet. Further, the representative core network includes a control-plane subsystem, such as a Mobility Management Entity (MME), or Access and Mobility Management Function (AMF) and Session Management Function (SMF).

When a UE enters into coverage of such a system, the UE could detect threshold strong coverage of a NB (e.g., a threshold strong reference signal broadcast by the NB). In turn, the UE and NB could then engage in control signaling (e.g., pursuant to the Radio Resource Control (RRC) protocol) to establish an air-interface connection (e.g., an RRC connection) through which the NB will serve the UE. And the NB could establish for the UE a context record indicating an identity of the established air-interface connection.

Further, if the UE is not already registered for service with the core network, the UE could transmit to the NB an attach request, which the NB could forward to a core network control-plane node (e.g., MME or AMF/SMF) for processing. In response to the UE's attach request, the control node could then authenticate the UE and establish for the UE a context record indicating that the UE is served by the NB, thus effectively establishing for the UE a control-plane signaling path tied or homed to that NB. Moreover, the control-plane node could responsively engage in signaling with the NB and with a core-network user-plane node (e.g., SGW or UPF), to coordinate establishment for the UE of a user-plane access bearer that extends through the core network from the NB to a user-plane node (e.g., PGW or UPF), and the user-plane node could similarly establish for the UE a context record identifying the UE's established access bearer.

Once the UE is connected and registered with the network, the NB could then serve the UE in a connected mode, managing downlink communication of packet data to the UE and uplink communication of packet data from the UE. For example, when packet data for the UE arrives at the core network from a transport network, the data could flow over the UE's established access bearer to the NB, and the NB could then schedule and provide transmission of that data over the UE's air-interface connection to the UE. Likewise, when the UE has data to transmit on the transport network, the UE could transmit a scheduling request to the NB, the NB could responsively schedule transmission of that data from the UE, the UE could accordingly transmit the data to the NB, and the NB could forward the data along the UE's access bearer for output onto the transport network.

In addition, when the UE is served by a NB, the UE may regularly evaluate the quality of its communication channel with the NB and provide the NB with channel-quality reports each specifying a channel quality indicator (CQI) value that represents a latest determined channel quality. The UE could determine channel quality based on various factors, such as but not limited to downlink signal-to-noise ratio. Further, an example system could define a range of CQI values from a lowest value representing poorest channel quality to a highest value representing the best channel quality. Based on the UE's evaluation, the UE could thus select an appropriate CQI value and transmit that value in a CQI report (e.g., through RRC signaling) to the NB.

The NB could then make use of a UE's reported CQI value as a basis to set a modulation and coding scheme (MCS) to be used for data transmissions over the air between the NB and the UE. For instance, the NB could apply a standard mapping table that maps various CQI values to associated MCS settings (e.g., modulation scheme and coding rate), designed to help minimize block error rate (BLER). Higher CQI could map to higher-order MCS, which could allow transmission of more bits of data per physical air interface resource (e.g., per subcarrier). Whereas, lower CQI could map to lower-order MCS, which could allow for transmission of fewer bits per physical air interface resource.

Further, such a wireless communication system could support UE operation in a discontinuous reception mode, or DRX mode, to help conserve power. In a normal or non-DRX mode of operation, when a UE has an air-interface connection with its serving NB, the UE's receiver (e.g., receive circuitry) would be fully powered on at all times, enabling the UE to repeatedly scan for NB control transmissions such as scheduling directives or other control signals intended for the UE. To help conserve power at times when the UE and its serving NB are not actively communicating with each other, however, the UE could transition to operate instead in the DRX mode.

In the DRX mode, the UE would retain its air-interface connection with its serving NB, but the UE would keep its receiver in a low-power or "sleep" state and would briefly "wake up" from that state (e.g., returning its receiver to full power) periodically or at other predefined instances to check for any pertinent NB control transmissions. To facilitate this, the UE's NB would have a record of the UE's DRX interval or other instances when the UE will be scanning for control transmissions, and the NB could time its control transmissions to the UE accordingly.

When a UE has an air-interface connection with its serving NB, the UE could regularly operate in the non-DRX mode, and the UE could transition to the DRX mode in response to passage of a threshold period of no data communication flowing over the air between the UE and the NB. For instance, the UE could start a timer after each instance of data transmission over the air to or from the UE, and when the timer reaches a defined DRX-trigger period, the UE could responsively transition itself to the DRX mode. Further, the UE's serving NB could apply a similar timer to determine when the UE has transitioned to DRX mode.

If and when data is then going to flow over the air to or from the UE (e.g., when the NB transmits to the UE a scheduling directive to schedule data communication to or from the UE), the UE could then transition back to the non-DRX mode, and the NB could update its UE context record accordingly. On the other hand, upon passage of a longer threshold inactivity period of no data communication flowing over the air between the UE and the NB, the NB could responsively release the UE's established air-interface connection altogether, transitioning the UE to an idle mode, which could require the UE to then re-connect with the NB from scratch if and when the UE seeks to engage in data communication.

As the industry advances from one generation of wireless technology to the next, UEs may need to support simultaneous connections on multiple radio access technologies. With the transition from 4G to 5G, for instance, it is expected that UEs will be configured to support use of both technologies concurrently, with an arrangement referred to as EUTRA-NR Dual Connectivity (EN-DC). With such an arrangement, a UE might include both a 4G radio and a 5G radio, and the 4G radio could be served by a 4G NB (e.g., an evolved-Node-B or eNB) concurrently with the 5G radio being served by a 5G NB (e.g., a gigabit-Node-B or gNB). This arrangement could help support transition from 4G technology to 5G technology and may provide other benefits as well. More generally, dual connectivity could encompass service on two or more radio access technologies concurrently, to facilitate technology transitions or for other purposes.

In a dual-connectivity scenario, where a UE is concurrently connected with two NBs, one of the NBs could operate as a master-NB, and the other NB could operate as a slave-NB. With such an arrangement, each NB could have a separate established access bearer for the UE. (For instance, in a "split-bearer" arrangement, separate access bearers could split off from a user-plane node such as an SGW or UPF, with one bearer homed to one NB and the other bearer homed to the other NB. Alternatively, a single access bearer could be homed to just one of the NBs, and that bearer could be split from that NB to extend via an inter-NB interface to the other NB.) But a control-plane for both of the UE's connections might be homed to just the master-NB.

To configure dual-connectivity, the UE might first connect with one NB, so that a control-plane homed to that NB would be established, and an access bearer homed to the NB would also be established. That NB could then operate as a master-NB to coordinate setup of a second, concurrently-existing air-interface connection with an associated access bearer with respect to another NB as slave-NB.

For instance, once single-connectivity is established for the UE, the UE's serving NB operating as a master-NB could direct the UE to scan for secondary coverage of a NB on another radio access technology. (For example, if the UE is initially connected with a 4G NB, that NB might direct the UE to scan for coverage of a 5G NB, or vice versa.) Upon receiving the UE's report of such detected coverage, the master-NB could then engage in signaling with the UE and that other NB, to coordinate establishment of a secondary air-interface connection between the UE and the other NB as slave-NB. Further the slave-NB could establish for the UE a context record indicating an identity of its established air-interface connection with the UE.

In addition, the master-NB could engage in signaling over its control-plane signaling path with a core network control-plane node (e.g., MME or AMF/SMF), to trigger establishment for the UE of an access bearer homed to the slave-NB. And the control-plane node could engage in signaling with the slave-NB (e.g., via the control-plane signaling path homed to the master-NB, and via inter-NB signaling between the master-NB and the slave-NB) and with a core-network user-plane node (e.g., SGW or UPF), to coordinate establishment for the UE of a user-plane access bearer that extends through the core network from the slave-NB to a user-plane node (e.g., PGW or UPF). Further, the control-node, user-plane node, and NBs could update their UE context records accordingly.

With dual-connectivity so configured, each NB could serve the UE over its respective air-interface connection with the UE. For instance, when the core network receives data destined to the UE, some of the data could pass over one of the UE's access bearers to the master-NB and other of the data could pass over the UE's other access bearer to the slave-NB. The master-NB could thus schedule and provide transmission to the UE of the portion of the data that it received for transmission to the UE. And the slave-NB could likewise schedule and provide transmission to the UE of the portion of the data that it received for transmission to the UE. Similarly, when the UE has data to transmit, each NB could coordinate uplink transmission of a portion of the data and could forward that portion of the data over the UE's access bearer homed to that NB for output onto the transport network.

In the dual-connectivity scenario, the UE may also regularly evaluate the quality of each of its communication channels and may provide respective CQI reports to each of its serving NBs, which the NBs could use as described above to set MCS for their respective communications with the UE. For instance, the UE could regularly evaluate quality of its connection with the master-NB and provide associated CQI reports to the master-NB, which the master-NB could use as a basis to set MCS for data communication over its air-interface connection with the UE. And the UE could also regularly evaluate quality of its connection with the slave-NB and provide associated CQI reports to the slave-NB, which the slave-NB could use as a basis to set MCS for data communication over its air-interface connection with the UE.

Further, in the dual-connectivity scenario, the UE could transition to DRX mode on either or both of its connections in response to passage of a predefined threshold DRX-trigger period of no data communication flowing over the air to or from the UE. For instance, in an EN-DC scenario, if and when no data communication has flowed over the UE's 4G air-interface connection for a defined threshold DRX-trigger period, then the UE could responsively transition to operate in the DRX mode on that 4G connection. And likewise, if and when no data communication has flowed over the UE's 5G air-interface connection for a defined threshold DRX-trigger period, then the UE could responsively transition to operate in the DRX mode on that 5G connection.

With dual-connectivity, however, it could be useful in some situations to transition the UE into DRX mode for a reason other than absence of data communication on the air interface. In particular, when a UE is served concurrently over two air-interface connections and is operating in the non-DRX mode on both connections, if channel quality on one of those connections is especially high, it may be desirable to have the UE's data communication occur on just that connection, particularly if channel quality on the UE's other connection is especially low. In that situation, it could be useful to transition the UE to DRX mode on its other connection.

For example, with EN-DC, if the UE's 5G connection has especially high CQI (perhaps when the UE's 4G connection has especially low CQI), it could be useful to serve the UE with data communication over just its 5G connection. To facilitate this, the UE could be put in DRX mode on its 4G connection, and data communication with the UE could be provided through the UE's 5G NB and 5G connection, at least while the CQI status remains as detected. Further, when the UE is put in DRX mode on one of its connections for this special reason, the NB serving the UE on that connection could avoid releasing the connection due to inactivity, so as to retain the connection for use when necessary.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a network that includes both 4G LTE and 5G-NR NBs, and where representative UEs are capable of engaging in EN-DC service (e.g., each having a 4G radio and a 5G radio and being capable of engaging in communication concurrently via those radios). It should be understood, however, that the principles disclosed herein could extend to apply with respect to other scenarios as well, such as with respect to other radio access technologies. Further, it should be understood that other variations from the specific arrangements and processes described are possible. For instance, various described entities, connections, functions, and other elements could be added, omitted, distributed, re-located, re-ordered, combined, or changed in other ways.

Figure 1:
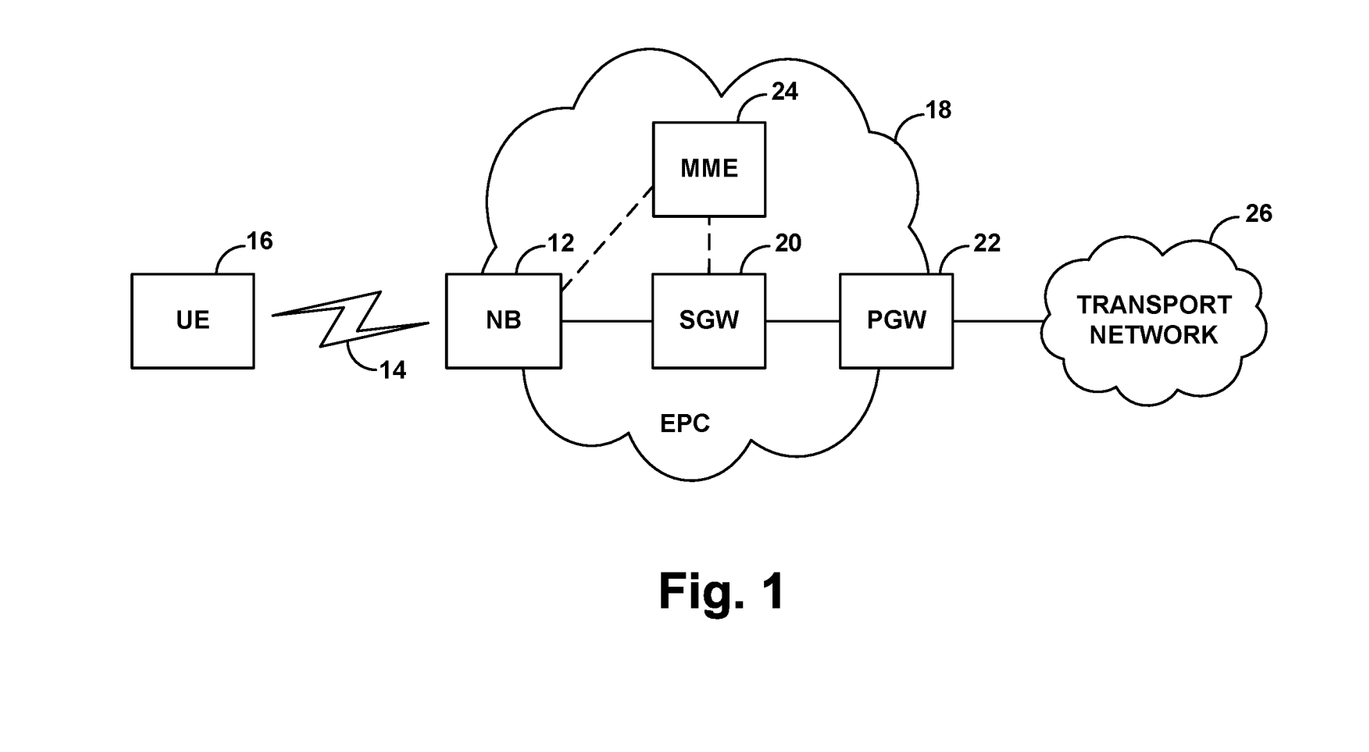
FIG. 1 is a simplified block diagram of an example 4G network arrangement.
Figure 2:
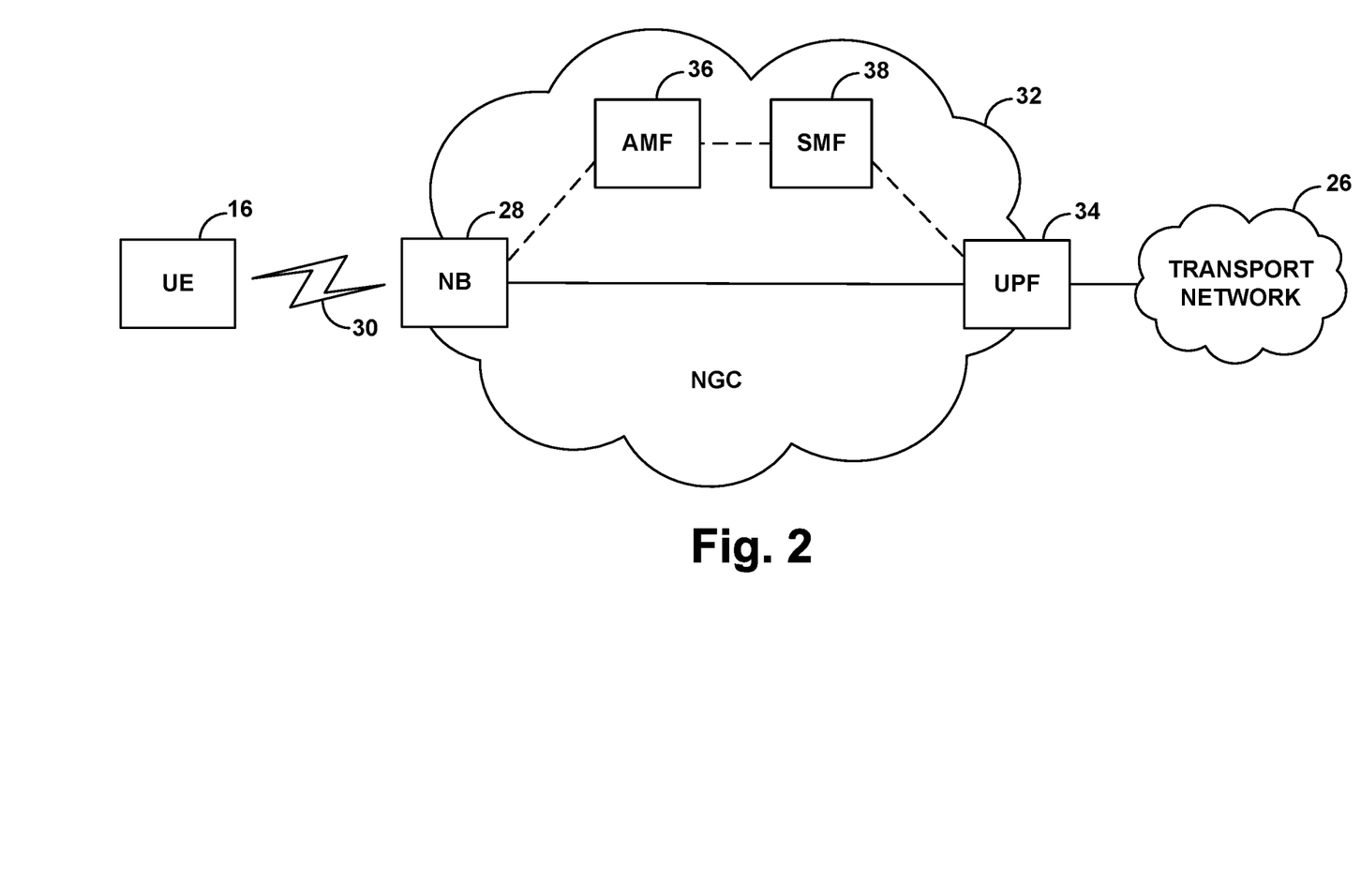
FIG. 2 is a simplified block diagram of an example 5G network arrangement.

FIGS. 1 and 2 depict example 4G and 5G networks, each including at least one NB, at least one control-plane node, and at least one user-plane node, and each providing connectivity with a representative transport network such as the Internet.

As shown in FIG. 1, an example 4G network includes a 4G NB (evolved NB (eNB)) 12, which provides a 4G coverage area 14 in which to serve UEs such as a representative UE 16. The 4G NB then sits as a node on an Enhanced Packet Core (EPC) access network 18 including an SGW 20, a PGW 22, and an MME 24. In particular, the 4G NB has an interface with the SGW, the SGW has an interface with the PGW, and the PGW connectivity with a transport network 26. Further, the 4G NB also has an interface with the MME, which also has an interface with the SGW.

In this 4G arrangement, the SGW and PGW operate as user-plane nodes through which user-plane communications (e.g., application-layer user communications) flow between the 4G NB and the transport network. And the MME operates as a control-plane node, responsible for coordinating setup of bearer connections and other control functions.

In line with the discussion above, when UE 16 enters into coverage of the 4G NB, the UE may discover coverage of the 4G NB (e.g., by detecting broadcast from the NB of a synchronization signal at a predefined center frequency of a carrier, and by detecting a threshold strong reference-signal broadcast from the 4G NB). The UE may then engage in access signaling and RRC signaling with the 4G NB to establish a 4G RRC connection defining a logical air interface connection through which the 4G NB will serve the UE. Further, the UE may transmit via its 4G RRC connection to the 4G NB an attach request to trigger registration of the UE for service.

Upon receipt of the UE's attach request, the 4G NB may forward the attach request to the MME, with this and/or other signaling and operations establishing for the UE a control-plane signaling path (e.g., S1-MME) between the 4G NB and the MME. The MME may then coordinate setup for the UE of a user-plane access bearer for carrying packet data between the 4G NB and the SGW. For instance, the MME could engage in bearer-setup signaling with the 4G NB and the SGW to establish for the UE an S1-U tunnel between the 4G NB and the SGW, discovering tunnel endpoint identifier (TEIDs) at the 4G NB and SGW and informing the 4G NB and SGW of each other's TEIDs as endpoints of the S1-U tunnel. Further, the SGW could responsively engage in signaling with the PGW to establish for the UE an S5 tunnel between the SGW and the PGW, the SGW could bridge the UE's S1-U and S5 tunnels together to effectively define for the UE a 4G access bearer extending between the 4G NB and the PGW, and the PGW could assign to the UE an IP address for communication on the transport network.

At this point, the 4G NB could then serve the UE in an RRC connected mode, scheduling downlink air interface communication to the UE of data that passes over the UE's 4G access bearer from the transport network, and scheduling uplink air interface communication of data from the UE, for forwarding over the UE's 4G access bearer to the transport network.

In FIG. 2, an example 5G network includes a 5G NB (gigabit NB (gNB)) 28, which provides a 5G coverage area 30 in which to serve UEs such as representative UE 16. The 5G NB then sits as a node on a Next Generation Core (NGC) access network 32 including an UPF 34, AMF 36, an SMF 38. In particular, the 5G NB has an interface with the UPF, and the UPF provides connectivity with transport network 26. Further, the 5G NB also has an interface with the AMF, the AMF has an interface with the SMF, and the SMF has an interface with the UPF.

In this 5G arrangement, the UPF operates as a user-plane node, through which user-plane communications flow between the 5G NB and the transport network. And the AMF and SMF cooperatively define a control-plane subsystem and operate as control-plane nodes, responsible for coordinating setup of bearer connections and other control functions.

With this arrangement, when UE 16 enters into coverage of the 5G NB, the UE may discover coverage of the 5G NB (in a manner similar to that described above). The UE may then engage in access signaling and RRC signaling with the 5G NB to establish a 5G RRC connection defining a logical air interface connection through which the 5G NB will serve the UE. Further, the UE may transmit via its 5G RRC connection to the 5G NB an attach request to trigger registration of the UE for service.

Upon receipt of the UE's attach request, the 5G NB may forward the attach request to the AMF, and the AMF may send a create-session request to the SMF, with this or other signaling establishing for the UE a control-plane signaling path extending effectively between the 5G NB and the SMF. Further, the SMF may responsively engage in bearer-setup signaling with the UPF and, via the AMF, with the 5G NB, to establish for the UE a tunnel defining a 5G access bearer that extends between the 5G NB and the UPF. For instance, the SMF could discover TEIDs at the 5G NB and UPF and inform the 5G NB and UPF of each other's TEIDs as endpoints of the access bearer. And the UPF may assign to the UE an IP address for communication on the transport network.

At this point, the 5G NB could then likewise serve the UE in an RRC connected mode, scheduling downlink air interface communication to the UE of data that passes over the UE's 5G access bearer from the transport network, and scheduling uplink air interface communication of data from the UE, for forwarding over the UE's 5G access bearer to the transport network.

Figure 3:
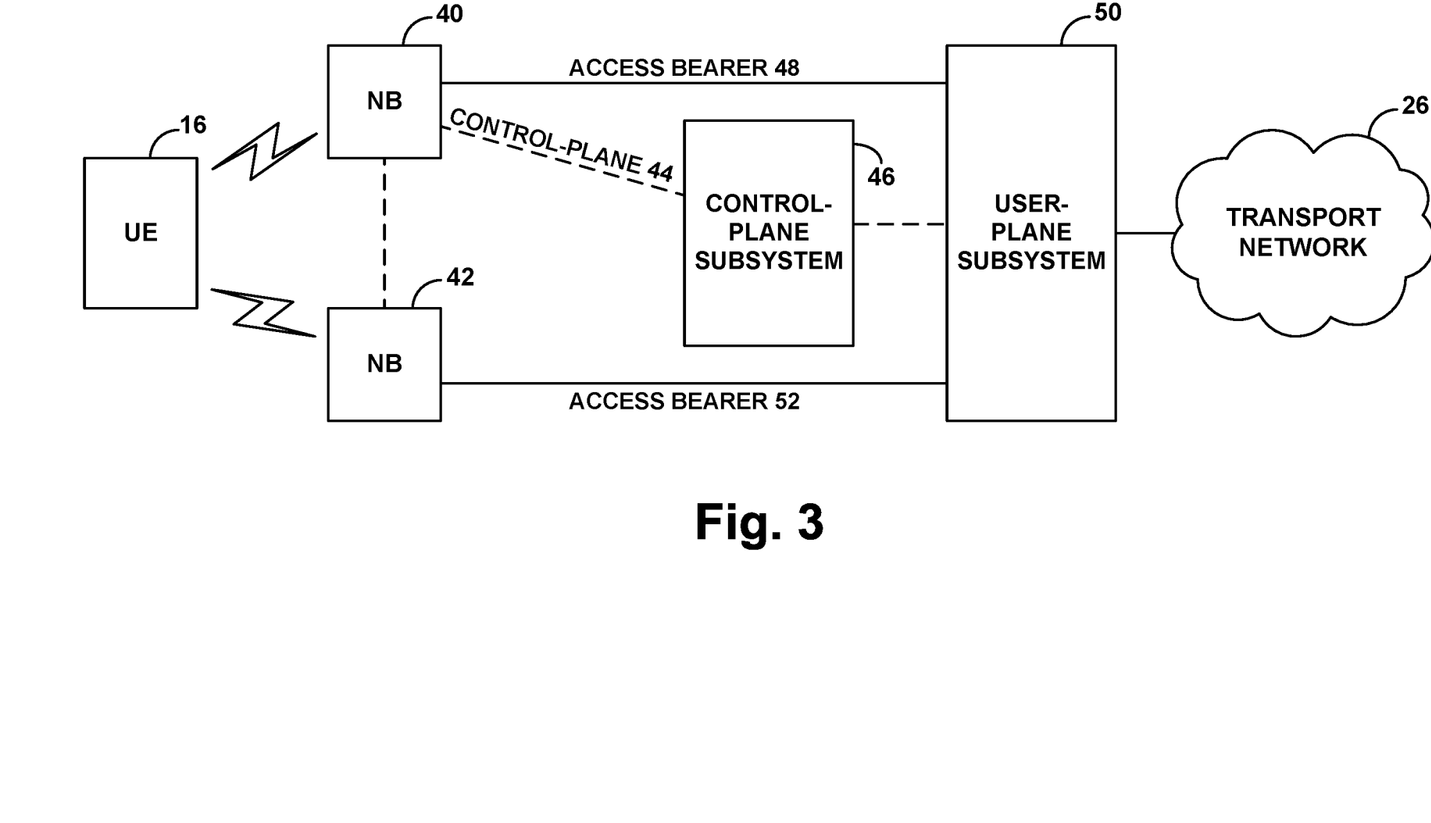
FIG. 3 is a simplified block diagram of an example dual-connectivity service configuration.

FIG. 3 next depicts an example dual-connectivity network arrangement. In particular, the arrangement of FIG. 3 includes two representative NBs 40, 42 such as a 4G NB and a 5G NB which could be co-located (e.g., positioned at a common cell site, sharing a common antenna tower and/or other NB equipment). Each of these NBs provides coverage according to a respective radio access technology. In the example arrangement, though, both NBs may sit as nodes on a common core network, such as an EPC or an NGC. Further, both NBs may sit as nodes on multiple core networks, including an EPC and an NGC for instance.

In a representative dual-connectivity implementation, as noted above, one of the NBs operates as a master-NB, and the other NB operates as a slave-NB. The master-NB could be the NB with which the UE initially connects and could coordinate or trigger addition of a slave-NB connection for the UE. A single core network, such as an EPC or NGC, could be used for both of the NBs in this situation, with a separate access bearer for the UE being homed respectively to each NB, and with a control-plane signaling path for both of the UE's connections being homed to the master-NB.

In line with the discussion above, for instance, the UE could first discover coverage of and connect with NB 40 and the UE could engage in attachment via NB 40, so that a control-plane signaling path 44 for the UE would be established between NB 40 and control-plane subsystem (e.g., an MME, or an AMF and SMF) 46, and an access bearer 48 for the UE would be established between NB 40 and a user-plane subsystem 50 (e.g., an SGW and PGW, or a UPF). As such, the control-plane signaling path 44 and access bearer 48 would each be anchored or homed to NB 40.

Operating as a master-NB, NB 40 could then direct the UE to scan for secondary coverage and could receive from the UE a report that the UE has detected sufficient coverage from NB 42. And in response, NB 40 could direct the UE to connect with NB 42, which the UE could do as discussed above. Further, NB 40 could engage in signaling with NB 42 to inform NB 42 that this is a dual-connectivity scenario with NB 40 as master-NB, so that NB 42 will operate as a slave-NB in signaling communication with master-NB 40.

And NB 40 could engage in signaling over its existing control-plane signaling path 44 with control-plane subsystem 46 to trigger setup for the UE of an access bearer 52 between NB 42 and user-plane subsystem 50, i.e., an access bearer homed to NB 42. Here, control-plane subsystem 46 could engage in signaling with NB 42 via the control-plane signaling path homed to NB 40 and through inter-NB signaling between NB 40 and NB 42 and could further engage in signaling with user-plane subsystem 50. NB 42 could thus inform control-plane subsystem 46 of a TEID at NB 42, which control-plane subsystem 46 could share with user-plane subsystem 50, and user-plane subsystem 50 could inform control-plane subsystem 46 of a TEID at user-plane subsystem 50, which control-plane subsystem 46 could share with NB 42. And NB 42 and user-plane subsystem 50 could use these TEIDs as endpoints of the access bearer 52.

As noted above, access bearers 48, 52 could define a split-bearer arrangement, with splitting at user-plane node such as an SGW or UPF. For instance, if the core network is an EPC as discussed above, the UE may have an established S5 tunnel between a PGW and an SGW, and the UE may have two separate S1-U tunnels, one from the SGW to NB 40, and another from the SGW to NB 42, thus defining a split at the SGW. And if the core network is an NGC as discussed above, the UE may have an established access bearer tunnel from the UPF to NB 40 and a separate established access bearer tunnel from the UPF to NB 42.

In either case, when the user-plane subsystem 50 receives downlink data for transmission to the UE, the user-plane subsystem 50 could send some of the downlink data via access bearer 48 for transmission by NB 40 over the air to the UE and could send other of the downlink data via access bearer 52 for transmission by NB 42 over the air to the UE.

As further noted above, in this dual-connectivity arrangement, each NB could regularly receive CQI reports from the UE, with each report indicating quality of the air interface communication channel between the NB and the UE. In a representative system, the CQI reported by the UE could be a CQI index value from 1 to 15, with lower CQI corresponding with poorer channel quality and higher CQI corresponding with higher channel quality. And as noted above, each NB could use these received CQI reports as a basis to determine an MCS to direct for air interface communication between the NB and the UE.

Per the present disclosure, when a first NB is serving a UE on a first air-interface connection while a second NB is serving the UE on a second air-interface connection, the first NB could detect based on the UE's CQI reports and/or one or more other factors (possibly uplink signal analysis) when channel quality on the first air-interface connection is threshold high. For instance, the first NB could detect when the UE's reported CQI is higher than a predefined threshold, such as CQI 12 or another CQI value, perhaps when the CQI remains at or above the threshold for at least a predefined threshold period of time. Further, the detecting could be based on one or more current CQI reports from the UE and/or one or more past CQI reports from the UE at a similar time of day and/or at a similar location (which could indicate that the UE's channel quality is about to become threshold high).

In addition, the second NB could detect based on similar reports and/or other factors that channel quality of the second air-interface connection is threshold poor (e.g., is not threshold high). For instance, the second NB could detect that that QCI for the connection between it and the UE is lower than a predefined threshold value, such as QCI 6 or another QCI value, perhaps for at least a predefined threshold period of time, and also possibly based on current and/or historical data.

As noted above, in response to channel quality on the UE's first air-interface connection with the first NB being threshold high, the UE could be transitioned into DRX mode on its second air-interface connection with the second NB. This transition to DRX mode on the UE's second air-interface connection could be based solely on the existence of threshold high channel quality on the UE's first air-interface connection, without regard to channel quality on the UE's second air-interface connection. Alternatively, the transition could be based a combination of threshold high channel quality on the UE's first air-interface connection and threshold low channel quality on the UE's second air-interface connection.

This process could be carried out in various ways.

In one example implementation, when the first NB detects threshold high channel quality on the first air-interface connection, the first NB could responsively engage in signaling with the second NB to cause the second NB to put the UE in DRX mode on the second air-interface connection. For instance, the first NB could transmit via an inter-NB interface to the second NB an indication of the detected high channel quality on the first air-interface connection, and/or another signal, to which the second NB could be configured to respond by transitioning the UE to DRX mode on the second air-interface connection. The second NB could then responsively transmit to the UE a control message directing the UE to enter DRX mode on the second air-interface connection. And the UE and second NB could update their records accordingly to indicate that the UE is operating in the DRX mode on the second air-interface connection.

In a variation of this process, as noted above, transition of the UE to DRX mode on the second air-interface connection could be further conditioned on channel quality on the second air-interface connection being threshold low. To facilitate this in the example implementation, the second NB could transmit via the inter-NB interface to the first NB an indication that channel quality on the second air-interface connection is threshold low. The first NB could then engage in signaling with second NB to cause the second NB to put the UE in DRX mode on the second air-interface connection in response to a combination of the high channel quality on the first air-interface connection and the low channel quality on the second air-interface connection. Alternatively, the first NB could inform the second NB of the threshold high channel quality on the first air-interface connection, and the second NB could respond to that information by transitioning the UE to DRX mode on the second air-interface connection only if the second NB also determines that channel quality on the second air-interface connection is threshold low.

In another example implementation, the UE could report to the second NB the UE's channel quality of the UE's first air-interface connection, perhaps together with reporting to the second NB the UE's channel quality of the UE's second air-interface connection. The second NB could then detect that channel quality on the UE's first air-interface connection is threshold high, and perhaps further that channel quality on the UE's second air-interface connection is threshold low. And in response, the second NB could put the UE in DRX mode on the second-air interface connection as discussed above. Other examples are possible as well.

Note that when the UE operates in DRX mode on its second air-interface connection as a result of this process, the UE will continue to operate in non-DRX mode on its first air-interface connection. To facilitate this, the UE and core network could be set to engage in bearer data communication via the UE's first serving NB and the first air-interface connection rather than via the UE's second serving NB and the second air-interface connection.

For instance, if the second NB transmits to the UE a control message directing the UE to enter DRX mode on the second air-interface connection, as this is not a result of an absence of communication on the second air-interface communication for the DRX-trigger period, the UE could responsively set itself to restrict its uplink bearer data communication to be with the first NB and not with the second NB. Thus, when the UE has bearer data to transmit, the UE may send a scheduling request to the first NB to trigger scheduled uplink transmission of all of that data to the first NB (rather than possibly transmitting some of the data to the second NB). Further, the second NB could engage in signaling with a control-plane node of the core network to trigger setting of a user-plane node of the core network to send all downlink bearer data transmission for the UE to the first NB (rather than possibly sending some of the downlink bearer data to the second NB.)

In addition, as noted above, when the UE operates in DRX mode on its second air-interface connection as a result of this process, it may be useful to prevent loss of that second air-interface connection altogether, in order to facilitate use of the second air-interface connection when desired. This could be useful in a situation where, of the UE's two air-interface connections, only the second air-interface connection supports a particular type of communication such as voice communication. In that situation, maintaining the UE's second air-interface connection, albeit in DRX mode, could allow the UE to quickly transition back to non-DRX mode and engage in that particular type of communication without needing to engage in the time-consuming process of establishing a new connection with the second NB.

In normal operation as described above, a UE's serving NB may release the UE's air-interface connection once a predefined threshold inactivity period passes without data communication flowing to or from the UE over the air-interface connection. To prevent that from happening in the present process, when the UE has been put in DRX mode on its second air-interface connection as a result of threshold high channel quality on its first air-interface connection, the UE's second serving NB could responsively not apply an inactivity timer for the UE's second air-interface connection. Instead, in an example implementation, the second NB and first NB could interwork to apply an inactivity timer only for the UE's first air-interface connection. Thus, when no data has flowed to or from the UE on the first air-interface connection for the inactivity period, the first NB and second NB could release their respective air-interface connections with the UE.

Further, in an example implementation, once the UE has been put into DRX mode on its second air-interface connection as a result of this process, the UE could continue to provide channel-quality reports to each of its NBs. And when the channel-quality situation changes, the UE could be transitioned back to the non-DRX mode on its second air-interface connection. For instance, once channel quality on the UE's first air-interface connection is no longer threshold high, perhaps for a threshold time period, the signaling and process steps discussed above could be reversed. Thus, the UE could once again operate in non-DRX mode on both of its connections.

Note that in an example EN-DC implementation, this process could be carried out with either the 4G NB or 5G NB being the first NB and the other NB being the second NB. Further, the process could be carried out regardless of which NB is the master-NB and thus regardless of which NB is the slave-NB.

For instance, without limitation, when the UE reports threshold high CQI on its 5G connection, the UE could be responsively transitioned to DRX mode on its 4G connection. For example, the 5G NB could signal to the 4G NB to inform the 4G NB of the threshold high CQI on the 5G connection. And in response, the 4G NB could transmit to the UE an RRC connection-reconfiguration message or the like that is interpretable by the UE to cause the UE to operate in the DRX mode, and the UE and NB could update their records accordingly. Further, while the UE is operating in that mode, the UE's 4G NB could avoid releasing the UE's 4G connection, so that the 4G connection could be quickly available for use to facilitate voice communication and/or another type of communication, particularly if the 4G connection supports that type of communication but the 5G connection does not.

Figure 4:
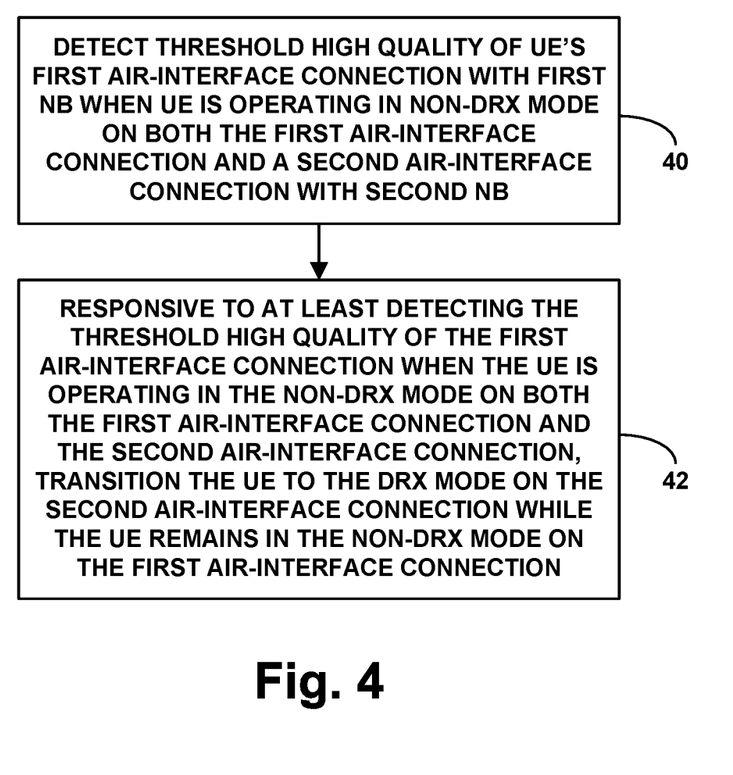
FIG. 4 is a flow chart depicting an example method in accordance with the present disclosure.

FIG. 4 is a flow chart depicting a method that can be carried out in accordance with the present disclosure to configure service of a UE when the UE has a first air-interface connection with a first NB and a second air-interface connection with a second NB, in a situation as discussed above where, on each connection, the UE is operable in a DRX mode and in a non-DRX mode. This method could be carried out by a wireless service provider that makes use of multiple NBs and a core network as described above for instance, or the method could be carried out specifically by one or more entities of such a wireless communication system, or by one or more other entities.

As shown in FIG. 4, at block 40, the method includes detecting threshold high quality of the first air-interface connection when the UE is operating in the non-DRX mode on both the first air-interface connection and the second air-interface connection. And at block 42, the method includes, responsive to at least detecting the threshold high quality of the first air-interface connection when the UE is operating in the non-DRX mode on both the first air-interface connection and the second air-interface connection, transitioning the UE to the DRX mode on the second air-interface connection while the UE remains in the non-DRX mode on the first air-interface connection.

When the UE operates in the DRX mode on the second air-interface connection while the UE remains in the non-DRX mode on the first air-interface connection, bearer data communication to and from the UE may thus flow over the first air-interface connection but not over the not over the second air-interface connection.

In line with the discussion above, in this process, the transitioning of the UE to the DRX mode on the second air-interface connection could beneficially not be based on absence of bearer data communication on the second air-interface connection. Further, the transitioning could be conditioned on also detecting threshold low quality of the second air-interface connection. And the transitioning could involve the second NB transmitting over the second air-interface connection to the UE a signaling message interpretable by the UE to cause the UE to transition to the DRX mode on the second air-interface connection.

As also discussed above, the act of detecting the threshold high quality of the first air-interface connection could be based on UE-reported channel quality of the first air-interface connection being at least as high as a predefined threshold channel quality level. And the detecting could be carried out by one or both of the two NBs.

Further, as discussed above, the method can additionally involve, upon transitioning the UE to the DRX mode on the second air-interface connection responsive to the detecting of the threshold high quality of the first air-interface connection, retaining the second air-interface connection regardless of absence of bearer data communication on the second air-interface connection. For instance, the second NB could forgo application of an inactivity timer for timing absence of bearer data communication on the second air-interface connection, the expiration of which would trigger release of the second air-interface connection. However, upon the transitioning the UE to the DRX mode on the second air-interface connection responsive to the detecting of the threshold high quality of the first air-interface connection, the system could apply an inactivity timer for timing an absence of bearer data communication on the first air-interface connection, and upon expiration of the inactivity timer, both the UE's first air-interface connection and the UE's second air-interface connection could be released.

Still further, as discussed above, the method could additionally involve, after transitioning the UE to the DRX mode on the second air-interface connection while the UE remains in the non-DRX mode on the first air-interface connection, reverting the UE to the non-DRX mode on the second air-interface connection. For instance, the method could include then detecting that quality of the first air-interface connection is no longer threshold high and, responsive to detecting that quality of the first air-interface connection is no longer threshold high, reverting the UE to the non-DRX mode on the second air-interface connection, so that the UE would then again operate in the non-DRX mode on both the first air-interface connection and the second air-interface connection.

As indicated, various features described above could be implemented by a wireless communication system such as that shown in FIG. 3. In particular, the system could include a first NB configured to provide first coverage and a second NB configured to provide second coverage. And the wireless communication system could be configured to control operation of a UE when the UE is being served concurrently by the first NB over a first air-interface connection and by the second NB over a second air-interface connection, where, on each connection, the UE is operable in a DRX mode and in a non-DRX mode.

In that context, controlling operation of the UE could involve the detecting and transitioning operations as discussed above. For instance, the first NB could include a controller configured to perform the detecting based on channel-quality reporting from the UE, and the second NB includes could include a controller configured to perform the transitioning of the UE by transmitting to the UE a control signal interpretable by the UE to cause the UE to transition to the DRX mode on the second air-interface connection. For instance, each controller could comprise at least one processing unit programmed with instructions executable by the processing unit to cause the controller and thus the host NB to carry out such operations.

Various features discussed above can be carried out in this context as well, and vice versa.

Figure 5:
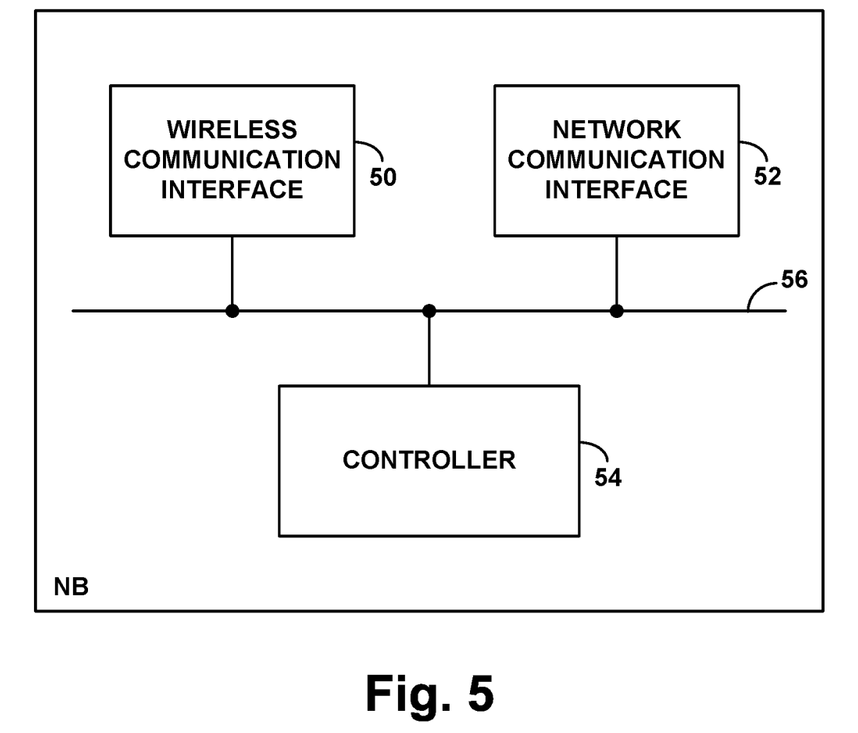
FIG. 5 is a simplified block diagram of a NB operable in accordance with the present disclosure.

Finally, FIG. 5 is a simplified block diagram an example NB that could be operable in accordance with the present disclosure. As shown, the example NB includes a wireless communication interface 50, a network communication interface 52, and a controller 54, all of which may be communicatively linked together by a system bus, network, or other connection mechanism 56.

In this arrangement, the wireless communication interface 50 could be configured to provide cellular coverage and to provide air-interface service, engaging in air interface communication with served UEs. As such, wireless communication interface 50 could comprise an antenna structure, which may be tower mounted or may take other forms, and associated components such as a power amplifier and a wireless transceiver, so as to facilitate providing a coverage area defining an air interface having a downlink and an uplink, and engaging in transmission and reception of bearer and control data over the air interface in accordance with an air interface protocol such as any of those noted above. Further, network communication interface 52 could comprise a wired or wireless interface, such as an Ethernet network communication interface, configured to support communication with other entities, such as entities on an EPC and/or entities on an NGC for instance.

Controller 54 could then comprise control logic to cause the NB to carry out particular operations including those discussed above. As such, the controller 54 could take various forms, including but not limited to a processing unit including one or more processors (e.g., general purpose microprocessors and/or dedicated processing units) and non-transitory data storage (e.g., one or more volatile and/or non-volatile storage components, such as magnetic, optical, or flash storage) holding, storing, encoded with, or otherwise embodying or having program instructions executable by the processing unit to cause the NB to carry out various operations described herein. It should also be understood that the present disclosure contemplates a non-transitory computer readable medium having encoded thereon program instructions executable to carry out such operations as well.

In an example implementation, the operations that controller 54 is configured to cause the NB to carry out include: while the NB is serving the UE over an air-interface connection and the UE is operating in a non-DRX mode on the air-interface connection, transitioning the UE from the non-DRX mode on the air-interface connection to a DRX mode on the air-interface connection in response to threshold high quality of another air-interface connection over which the UE is being served concurrently by another NB. Further, in line with the discussion above, this transitioning might not be based on absence of bearer data communication with the UE.

Exemplary embodiments have been described above. Those skilled in the art will understand, however, that changes and modifications may be made to these embodiments without departing from the true scope and spirit of the invention.

We claim:

1. A method for configuring service of a user equipment device (UE) when the UE has a first air-interface connection with a first Node-B (NB) and a second air-interface connection with a second NB, wherein on each connection, the UE is operable in a discontinuous reception (DRX) mode and in a non-DRX mode, the method comprising:

detecting threshold high quality of the first air-interface connection when the UE is operating in the non-DRX mode on both the first air-interface connection and the second air-interface connection;

responsive to at least detecting the threshold high quality of the first air-interface connection when the UE is operating in the non-DRX mode on both the first air-interface connection and the second air-interface connection, transitioning the UE to the DRX mode on the second air-interface connection while the UE remains in the non-DRX mode on the first air-interface connection; and upon the transitioning the UE to the DRX mode on the second air-interface connection responsive to at least the detecting of the threshold high quality of the first air-interface connection, retaining the second air-interface connection regardless of absence of bearer data communication on the second air-interface connection, wherein retaining the second air-interface connection regardless of absence of bearer data communication on the second air-interface connection comprises forgoing application by the second NB of an inactivity timer for timing absence of bearer data communication on the second air-interface connection, the expiration of which would trigger release of the second air-interface connection.

2. The method of claim 1, wherein the transitioning of the UE to the DRX mode on the second air-interface connection is not based on absence of bearer data communication on the second air-interface connection.

3. The method of claim 1, further comprising conditioning the transitioning on further detecting threshold low quality of the second air-interface connection.

4. The method of claim 1, wherein detecting the threshold high quality of the first air-interface connection is based on UE-reported channel quality of the first air-interface connection being at least as high as a predefined threshold channel quality level.

5. The method of claim 1, wherein detecting the threshold high quality of the first air-interface connection is carried out by at least one of the first NB and the second NB.

6. The method of claim 5, wherein transitioning the UE to the DRX mode on the second air-interface connection comprises:

transmitting over the second air-interface connection from the second NB to the UE a signaling message interpretable by the UE to cause the UE to transition to the DRX mode on the second air-interface connection.

7. The method of claim 1, wherein when the UE operates in the DRX mode on the second air-interface connection while the UE remains in the non-DRX mode on the first air-interface connection, bearer data communication to and from the UE flows over the first air-interface connection and not over the second air-interface connection.

8. The method of claim 1, further comprising, upon the transitioning the UE to the DRX mode on the second air-interface connection responsive to the detecting of the threshold high quality of the first air-interface connection, applying an inactivity timer for timing an absence of bearer data communication on the first air-interface connection, and upon expiration of the inactivity timer, releasing both the first air-interface connection and the second air-interface connection.

9. The method of claim 1, further comprising, after transitioning the UE to the DRX mode on the second air-interface connection while the UE remains in the non-DRX mode on the first air-interface connection;
    detecting that quality of the first air-interface connection is no longer threshold high; and
    responsive to detecting that quality of the first air-interface connection is no longer threshold high, reverting the UE to the non-DRX mode on the second air-interface connection, wherein the UE then again operates in the non-DRX mode on both the first air-interface connection and the second air-interface connection.

10. A wireless communication system comprising:
    a first Node-B (NB) configured to provide first coverage; and
    a second NB configured to provide second coverage,
    wherein the wireless communication system is configured to control operation of a user equipment device (UE) when the UE is being served concurrently by the first NB over a first air-interface connection and by the second NB over a second air-interface connection, wherein on each connection, the UE is operable in a discontinuous reception (DRX) mode and in a non-DRX mode, and wherein controlling operation of the UE includes:
    (i) detecting threshold high quality of the first air-interface connection when the UE is operating in the non-DRX mode on both the first air-interface connection and the second air-interface connection,
    (ii) responsive to at least detecting the threshold high quality of the first air-interface connection when the UE is operating in the non-DRX mode on both the first air-interface connection and the second air-interface connection, transitioning the UE to the DRX mode on the second air-interface connection while the UE remains in the non-DRX mode on the first air-interface connection, and
    (iii) upon the transitioning the UE to the DRX mode on the second air-interface connection responsive to at least the detecting of the threshold high quality of the first air-interface connection, retaining the second air-interface connection regardless of absence of bearer data communication on the second air-interface connection, wherein retaining the second air-interface connection regardless of absence of bearer data communication on the second air-interface connection comprises forgoing application by the second NB of an inactivity timer for timing absence of bearer data communication on the second air-interface connection, the expiration of which would trigger release of the second air-interface connection.

11. The wireless communication system of claim 10, wherein the first NB includes a controller configured to perform the detecting based on channel-quality reporting from the UE, and wherein the second NB includes a controller configured to perform the transitioning of the UE by transmitting to the UE a control signal interpretable by the UE to cause the UE to transition to the DRX mode on the second air-interface connection.

12. The wireless communication system of claim 11, wherein each controller comprises at least one programmed processing unit.

13. The wireless communication system of claim 10, wherein the transitioning of the UE to the DRX mode on the second air-interface connection is not based on absence of bearer data communication on the second air-interface connection.

14. The wireless communication system of claim 10, wherein the transitioning is conditioned on further detecting threshold low quality of the second air-interface connection.

15. The wireless communication system of claim 10, wherein when the UE operates in the DRX mode on the second air-interface connection while the UE remains in the non-DRX mode on the first air-interface connection, bearer data communication to and from the UE flows over the first air-interface connection and not over the second air-interface connection.

16. A Node-B (NB) configured to control service of a user equipment device (UE), the NB comprising:
    a wireless communication interface through which the NB is configured to provide air-interface service;
    a network communication interface though which the NB is configured to communicate on a core network; and
    a controller for controlling the service of the UE, wherein the controller is configured to cause the NB to carry out operations including:
    while the NB is serving the UE over an air-interface connection and the UE is operating in a non-discontinuous-reception (non-DRX) mode on the air-interface connection, transitioning the UE from the non-DRX mode on the air-interface connection to a DRX mode on the air-interface connection in response to threshold high quality of another air-interface connection over which the UE is being served concurrently by another NB, and
    upon the transitioning the UE to the DRX mode on the air-interface connection, retaining the air-interface connection regardless of absence of bearer data communication on the air-interface connection, wherein retaining the second air-interface connection regardless of absence of bearer data communication on the air-interface connection comprises forgoing application of an inactivity timer for timing absence of bearer data communication on the air-interface connection, the expiration of which would trigger release of the air-interface connection.

17. The NB of claim 16, wherein the transitioning of the UE to the DRX mode is not based on absence of bearer data communication with the UE.

* * * * *